April 13, 1965     D. R. PIERCE     3,177,901
FLEXIBLE CONDUIT
Filed Aug. 1, 1962

INVENTOR.
Donald R. Pierce
BY
Barnard & McGlynn
ATTORNEYS

United States Patent Office 3,177,901
Patented Apr. 13, 1965

3,177,901
FLEXIBLE CONDUIT
Donald R. Pierce, Ambler, Pa., assignor to Teleflex Incorporated, North Wales, Pa., a corporation of Delaware
Filed Aug. 1, 1962, Ser. No. 214,142
9 Claims. (Cl. 138—130)

The present invention relates to a flexible conduit assembly generally of the type in which a flexible tubular member is overlaid with a plurality of tension bearing elements wrapped with a long lead and which elements are in turn overlaid with a common protective casing. A method and apparatus for manufacturing such conduit is shown and described in copending application Serial No. 27,137 Cadwallader, filed May 15, 1960, now Patent No. 3,138,511.

In general, such tension bearing elements have been made of wire. However, wire elements, as employed in the past, have many disadvantages which are overcome by the subject invention.

Before discussing some of the problems found in earlier types of flexible conduits, it is to be noted that it is highly desirable to use a full complement of such elements circumferentially disposed about the subadjacent tubular member. When referring to a full complement of such elements, it is intended to mean that whatever the diameter of the elements wrapped about the subadjacent tube, they will be used in sufficient numbers that no further elements of the same size can be added. This does not mean that the elements are circumferentially abutting since in many instances this is consciously avoided. However, in general, the cumulative clearances between individual elements should not be so great as to permit the fitting in of an additional element.

The necessity or desirability of providing clearance between the tension carrying elements in the past has been due to the fact that metal wires have been used and where such wires are placed in abutting relationships the cumulative static friction between perhaps sixteen of such elements tends to make such conduits inflexible. Inflexibility in this case simply means that while such conduit may be bent the internal frictional loads between the tension elements may be so great as to prevent the natural resilience or flexibility of the wires from overcoming such loads and the conduit will remain in a form to which it is bent and will not normally return to a straight condition. Such inflexibility is frequently a great disadvantage in practice requiring a positive effort to straighten the conduit.

A copending application Serial No. 191,978 to Pierce filed May 2, 1962 discloses a new type of flexible conduit in which a full complement of long lead elements may be utilized in a way in which considerable improvement in conduit flexibility is attained. In general, the earlier filed Pierce application discloses the use of a circumferential mix of metal wires and non-metal or plastic filaments variously combined to form a full complement of elements about an inner tubular member.

The present invention is clearly distinguishable from the earlier filed Pierce application in many particulars. First, in the present unique conduit every long lead element of the tension carrying sheath is a significant tension load bearing member. More specifically, each element includes a wire member. In the aforenoted Pierce application, the non-metal, e.g. plastic, filament elements are primarily utilized to perform functions other than carrying tension loads. In the present invention, every element of the wire sheath is or includes a significant tension bearing member.

In addition, however, the present invention also utilizes the significant advantages of non-metallic materials such as plastic as an integral part of such sheath. In this way, the considerable advantages of greatly reduced conduit weight and increased flexibility achieved in the earlier Pierce design are retained and coupled with additional and unique advantages which stem from the novel structure hereinafter described in detail.

Before undertaking a detailed description of the subject invention, it is important to point out a problem in the manufacture of flexible conduits that has been without practical solution until the development of the subject conduit.

In general, it has become almost axiomatic that the load capacities of flexible conduits in tension and compression are rarely matched. This has certainly been the case with flexible conduits of the type with which we are generally concerned and which include a flexible plastic inner tube member overlaid with a plurality of tension load bearing elements wrapped about the inner tube on a long lead. As constructed in the past, such conduits have almost always been significantly stronger in tension than in compression loadings. Even where additional members have been added to such conduits to increase the column, or compression, strength to withstand whatever compression loads are contemplated, invariably the tension load capacity of the conduit is at a considerably different value.

This mismatching of tension and compression capacities for a flexible conduit has been due to the manner in which such conduits have been constructed and the type of elements which have been used therein. For instance, one starts with a given load range which the flexible inner core or cable member must transmit. This then establishes the cable O.D. and in turn the I.D. and O.D. of the flexible tubular member. Inasmuch as it is highly desirable to employ a full complement of long lead tension carrying elements such elements have been added in sufficient number to simply enclose the subadjacent tubular member. Even though short pitch roving or wire members have been wrapped around the long lead elements to increase the conduit hoop strength, such conduit has almost invariably been significantly stronger in tension than in compression.

In manufacturing all purpose type conduit which can be assumed to be subjected to both compression and tension loading, the conduit is only as good as its weakest load bearing capacity. In other words, a conduit which will withstand 2500 pounds of tension loading but fails in compression at 1500 pounds may be considerably overdesigned in tension. Further, the overdesign or excess capacity of a product represents unnecessary cost.

The present invention permits a much more accurate matching or controlling of the tension and compression load carrying capacities of a conduit whereby such overdesign for one type of loading is avoided.

While the tension load capacity of an all metal wire sheath conduit can be varied to a certain extent by varying the wire sizes, this has certain practical limitations including the fact that as more smaller wires are used the greater the total surface area contact between said wires, hence, if the wires abut, the greater the static friction created within the sheath and correspondingly the less flexible will be the ultimate conduit. Thus, flexible conduits utilizing all metal tension load bearing sheaths are very limited in achieving an accurate match of tension and compression capacities within the context of utilizing a full complement of tension members and at the same time maintaining satisfactory conduit flexibility.

It is, therefore, a general object of the present invention to provide a flexible conduit utilizing a flexible inner tube member which is adapted to movably support a motion transmitting element therewithin and to overlay such tubular member with a full complement of tension load bearing members each of which includes a wire element and at least certain of which members are constructed in such a way as to prevent any metal to metal contact between the wire elements. More specifically, the subject conduit is of the type which preferably includes a common plastic casing extruded or otherwise formed about the tension load bearing members whereby none of the metal elements of the conduit are exposed.

It is a further object of the present invention to provide such a flexible conduit in which at least alternate of the long lead tension load bearing members comprises a wire element encased in a plastic jacket.

It is also an object and advantage of the present invention to provide a flexible conduit in which different size wires may be combined to form a tension sheath but in which the smaller wires may be plastic jacketed whereby the diameter of all of the sheath elements may be made equal. In this way the extruded plastic conduit cover may be maintained in a round form.

Additional objects and advantages of the invention will be apparent from a perusal of the detailed description which follows.

In the drawings.

In the drawings like members are identified by the same numerals.

Figure 1:
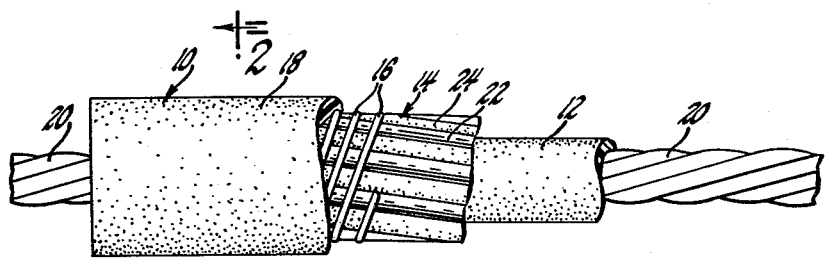
FIGURE 1 is a cut away view of a flexible conduit embodying the subject invention.

A flexible conduit assembly 10 includes an inner tubular member 12 overlaid with a sheath 14 surrounded by roving 16 which is, in turn, covered by a plastic jacket or covering 18. The assembly includes a movable core element 20 disposed within tubular member 12.

It is to be understood that the movable core or cable element 20 may either be a push-pull or rotary element depending on the type of control with which the conduit is to be used.

Tubular member 12 may be formed in any satisfactory manner and of a suitable material so as to insure its flexibility and provide a low frictional support for the movable core element 20. While tubular member 12 may thus assume many forms, it is preferred that such member be made of a plastic material so as to provide a closed tube. Many plastic materials are available for use with the subject invention, however, highly desirable and proven materials, particularly for tube 12, are the super polyamide resins, commonly known as nylon and polytetrafluoroethylene also known as Teflon. These materials have particularly demonstrated their capacity for use in this general type of environment.

In those instances where the operating requirements are not too severe and where low conduit costs are of paramount importance, less expensive plastic materials such as polyethylene, polypropylene, etc. may be used at least in some of the places where plastic components are indicated.

As already noted, in the past sheath 14 has been formed by wrapping a generally long lead or helix angle. While the helix angle or lead of such wires may be varied, generally in accordance with the type and magnitude of the loads to which the conduit is to be subjected, the helical sheath is generally wound with a rather long lead as shown. Where compression loads become an important or significant factor, it is within the contemplation of the present invention that tubular member 12 may be formed or another element added to withstand such compression loads without making the conduit inflexible.

The present invention relates to the manner in which sheath 14 is formed. In the past, such sheaths have traditionally been entirely employed wire members and thus have been characterized as being metallic. In the aforementioned Pierce application a composite metal-plastic sheath was developed which has many advantages over the all metal sheath. The present invention relates to another type of composite metal-plastic sheath construction in which every element of the tension sheath includes a wire element but at least some of which elements are encased in a plastic jacket.

Figure 2:
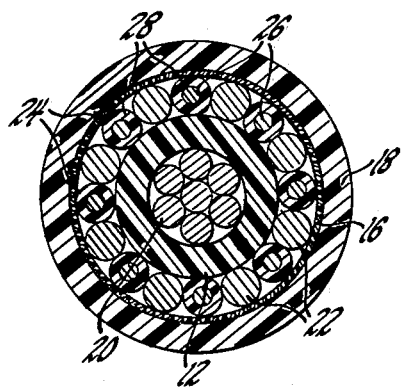
FIGURE 2 is a view along line 2—2 of FIGURE 1.

Referring now to FIGURE 2, it will be seen that sheath 14 includes a first set of circumferentially spaced wire elements 22. A second set of elements 24 are interspaced between elements 22. Each element 24 comprises a wire member 26 encased in a plastic cover 28.

The outside diameters of wire elements 22 and elements 24 are substantially equal in order that the outer surface of sheath 14 is as even as possible. However, the size of wire members 26 and the thickness of plastic casing 28 will be varied in accordance with the desired tension load capacity of sheath 14. By reducing the size of wire members 26 the total tension capacity of the sheath will also be reduced. On the other hand, as the size of members 26 is diminished the thickness of plastic casings 28 will be increased appropriately to maintain the diametrical equality of elements 22 and 24.

At the same time, the alternating plastic encased elements 24 prevent metal to metal contact between the sheath elements whereby frictional resistance is minimized to insure conduit flexibility. Accordingly, the plastic material employed in coating wire members 26 may be of any variety having lower frictional resistance than wire elements 22. Here again, nylon and Teflon have demonstrated their capacity for such use although less expensive flexible plastic materials, supra, may also be used.

Figure 3:
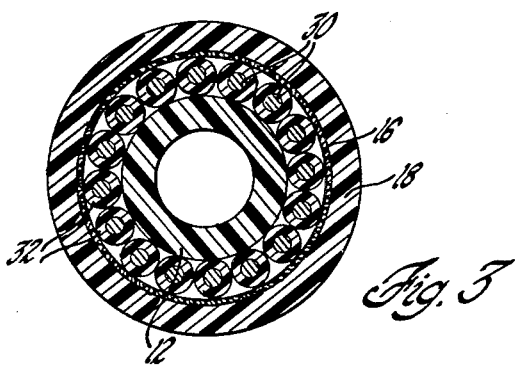
FIGURE 3 is a modification in which every tension wire is encased in a plastic jacket.

Another modification of the subject invention is shown in FIGURE 3. In this instance each element of the tension sheath includes a wire member 30 encased in a plastic covering 32. Once again, wire and plastic casing sizes will be determined by tension load requirements. The less the tension capacity required, the smaller may be the diameter of wires 30. In addition to permitting a reduction in the size of wires 30, the present invention also permits fewer of such wires to be used and yet maintaining the concept of a full complement sheath. In other words, the sheath is maintained full by utilizing thicker plastic casings around the individual wires which may be done without significantly varying the tension capacity of the sheath.

Since the tension sheath of FIGURE 3 completely utilizes plastic to plastic contact between the elements, the static friction will be minimized whereby the conduit will be highly flexible. Further, by reducing the metal content in the conduit the latter will be lighter in weight and thereby less expensive in terms of material and shipping costs.

As pointed out in the earlier Pierce application, an important problem in manufacturing with conduits utilizing inner plastic tubular members is in the maintaining the latter's inside diameter so as to insure a smoothly operating core element and at the same time insuring against too much clearance between the core element and the tube. A part of the problem of maintaining plastic tube I.D. within tolerances has been in the actual manufacture of the plastic tubing. On the other hand, even where such tubing is manufactured within prescribed tolerances, the inner tubular member may be subjected to sufficient heat during the formation of the conduit to disrupt these tolerances. For instance, outer covering 18 is normally extruded over the sheath 14. Inevitably the plastic is extruded in a hot condition. Even though the conduit may be subsequently quenched or cooled in a water tank, with an all metal sheath a good bit of this heat may be conveyed to the inner tubular member and thereby disrupt the previously maintained tolerances.

On the other hand, the present invention which utilizes a composite metal-plastic sheath reduces by as much as one-half the amount of sheath metal through which heat can be conducted. The combination, therefore, greatly reduces the transfer of heat to the inner plastic tubular member 12 during the extrusion of cover 18. In this way, it is considerably easier to maintain the tolerances, and particularly the I.D., of the inner tubular member.

In the modification of FIGURE 3 in which all wires 30 are encased in plastic substantially all metallic heat transfer is eliminated. In other words, plastic tube 12 is thermally insulated by the tension sheath whereby extrusion of outer casing 18 will not affect the dimensions of the tube. It is apparent that manufacturing accuracy is greatly enhanced by the subject invention.

In addition to the advantages already pointed out, the subject conduit by encasing at least half of the tension members in plastic has greater resistance to shock loads. A part of such shock loading is dissipated in the resilience of the plastic material.

It is apparent that variations in the type of conduit hereinabove shown and described may be made within the intended scope of the invention as set forth in the hereinafter appended claims.

I claim:
1. A flexible conduit comprising a tubular member, a sheath laid about said tubular member, said sheath comprising a plurality of elongated elements individually laid with a long lead upon said tubular member to provide a substantially full complement of said elements circumferentially spaced about said member, each of said elements including a longitudinal wire member, at least some of said wire members being encased in a non-metallic material throughout their lengths, and a common plastic casing enclosing said elements.

2. A flexible conduit as set forth in claim 1 in which the diameters of all elongated elements are substantially equal.

3. A flexible conduit comprising a tubular member, a sheath laid about said tubular member, said sheath comprising a plurality of elongated elements individually laid with a long lead upon said tubular member to provide a substantially full complement of said elements circumferentially spaced about said member, each of said elements including a longitudinal wire member, at least alternate of said wire members being encased in a non-metallic material throughout their lengths, and a common plastic casing enclosing said elements.

4. A flexible conduit comprising a tubular member, a sheath laid about said tubular member, said sheath comprising a plurality of elongated elements individually laid with a long lead upon said tubular member to provide a substantially full complement of said elements circumferentially spaced about said member, each of said elements including a longitudinal wire member, at least some of said wire members being encased in a plastic material throughout their lengths, and a common plastic casing enclosing said elements.

5. A flexible conduit comprising a tubular member, a plurality of elongated elements individually laid with a long lead upon said member to provide a substantially full complement of said elements circumferentially spaced about said member, each of said elements comprising a wire encased in a non-metallic material throughout its length, and a common plastic casing enclosing said elements.

6. A flexible conduit as set forth in claim 5 in which the diameters of all elongated elements are substantially equal.

7. A flexible conduit comprising a tubular member, a plurality of non-metallic filament members laid with long leads about said tubular member to form a closed sheath, each filament member including a wire core, and a common plastic casing enclosing said filament members.

8. A flexible conduit as set forth in claim 7 in which said filament members are formed of a plastic material having a low coefficient of friction.

9. A flexible conduit as set forth in claim 8 in which the tubular member is formed of a plastic material having a low coefficient of friction.

References Cited by the Examiner

UNITED STATES PATENTS

| 567,531 | 9/96 | Arnold | 138—133 X |
|---|---|---|---|
| 2,044,887 | 6/36 | Laguidara | 138—130 |
| 2,564,602 | 8/51 | Hurst | 138—125 |
| 2,725,713 | 12/55 | Blanchard. | |
| 3,013,443 | 12/61 | Morse | 138—134 X |
| 3,062,241 | 11/62 | Brumbach | 138—125 |
| 3,063,303 | 11/62 | Cadwallader | 74—501 |

FOREIGN PATENTS 520,585   6/53   Belgium.

EDWARD V. BENHAM, *Primary Examiner.*

BROUGHTON G. DURHAM, *Examiner.*